Jan. 3, 1928.

A. H. MITTAG 1,654,988

REGULATION OF ELECTRICAL CIRCUITS

Original Filed Oct. 28, 1925    2 Sheets-Sheet 1

Inventor:
Albert H. Mittag.

Inventor:
Albert H. Mittag

Patented Jan. 3, 1928.

1,654,988

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

REGULATION OF ELECTRICAL CIRCUITS.

Original application filed October 28, 1925, Serial No. 65,454. Divided and this application filed October 30, 1926. Serial No. 145,352.

My invention relates to the regulation of electrical machines or circuits, and has for its principal object the provision of an improved apparatus and method whereby the electrical conditions of such a machine or circuit may be reliably and sensitively regulated.

Various apparatus have been provided in the past for regulating the voltage or another electrical condition of a machine or circuit. As pointed out in my copending application, Serial No. 65,454, filed October 28, 1925, many of these apparatus comprise movable contacts or other elements which render them incapable of producing the fine degree of regulation required for stable operation of a machine or circuit under adverse conditions such as those encountered in connection with high voltage power systems subjected to heavy loads. The present application is a division of the aforesaid copending application and relates more particularly to the embodiments of the invention whereby minimum and maximum corrective effects are averaged in a manner to ensure proper regulation under adverse operating conditions.

My invention will be better understood from the following description when considered in connection with the accompanying drawings and its scope will be pointed out in the appended claims.

Figure 1:
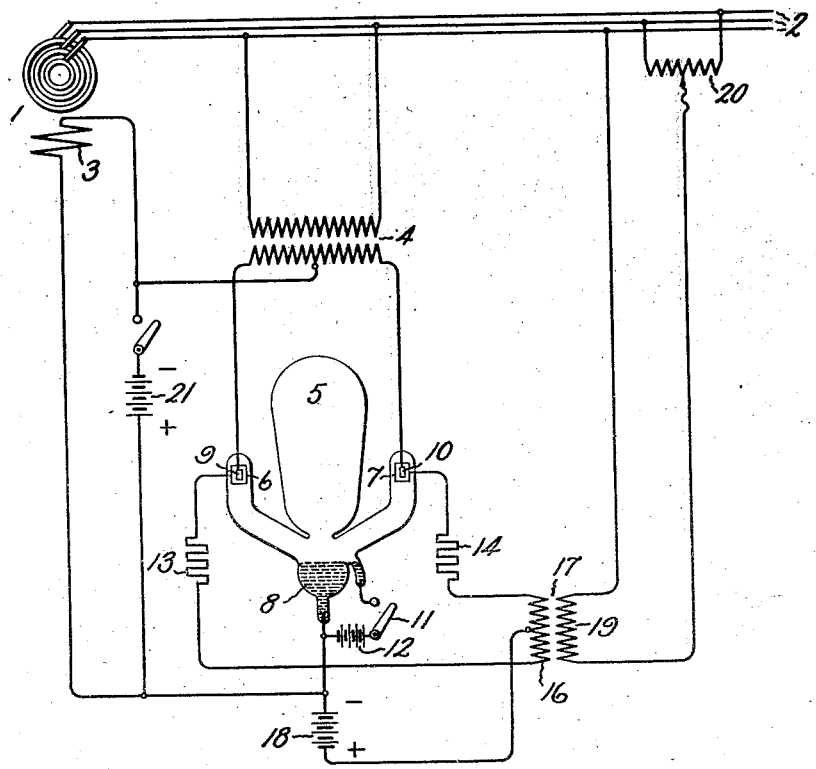
Figure 2:
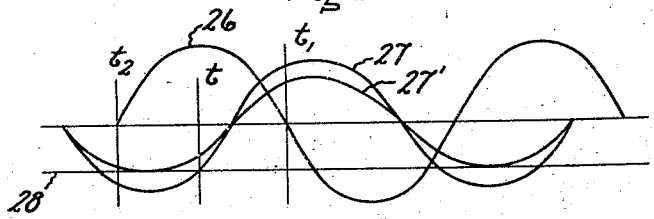
Figure 3:
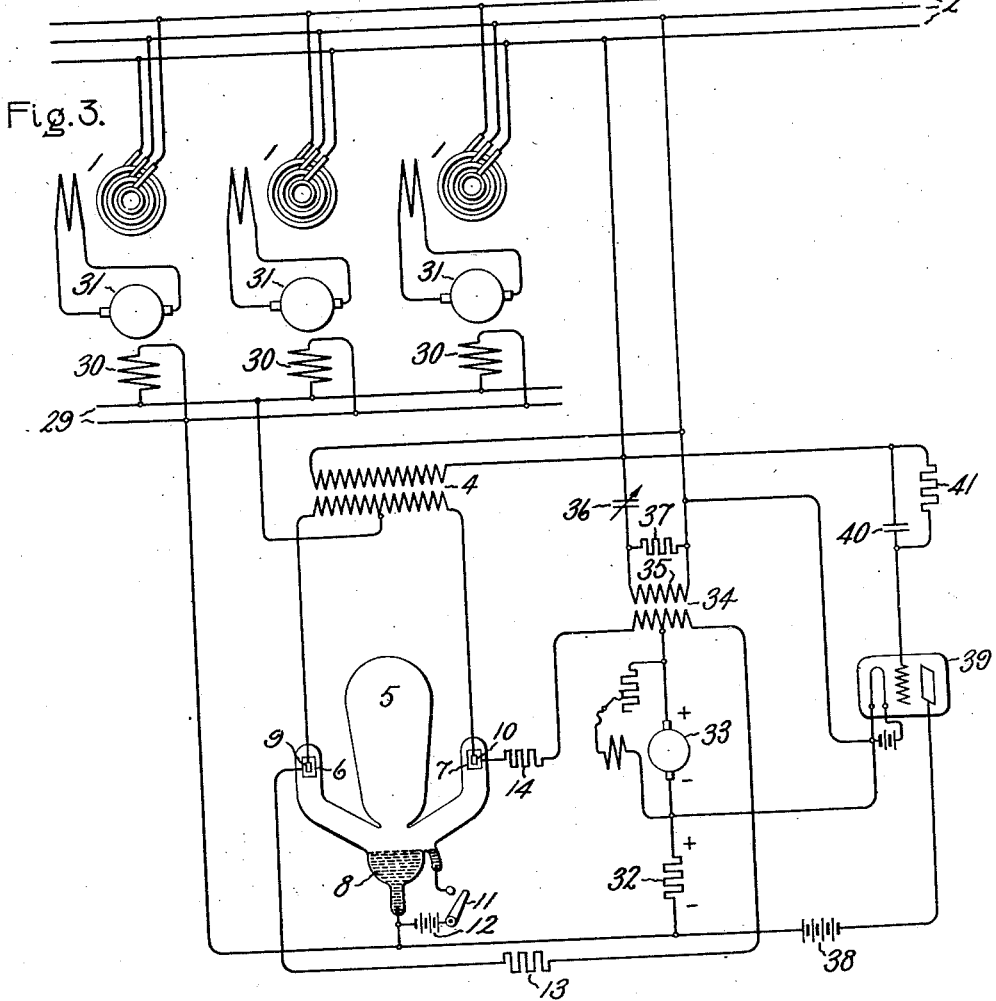
Figure 4:
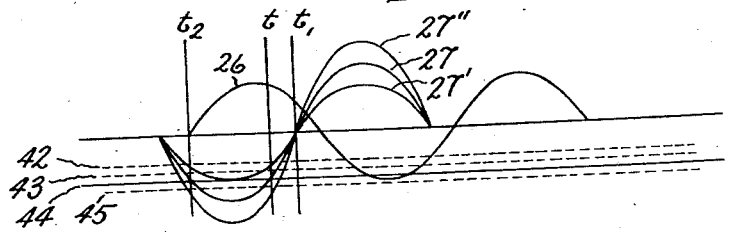

Referring to the drawings, Fig. 1 shows a regulating arrangement wherein my invention has been embodied; Fig. 2 illustrates certain details in the operation of this arrangement; Fig. 3 shows a modified embodiment of the invention; and Fig. 4 illustrates certain details in the operation of the arrangement illustrated by Fig. 3.

Fig. 1 shows an electrical machine 1 which is connected to a load circuit 2 and is provided with a field winding 3 connected to this circuit through a transformer 4 and an electrical valve 5 which comprises a grid or control electrodes 6 and 7, a mercury cathode 8 and anodes 9 and 10. The valve 5 is provided with a starting switch 11 and battery 12 and is of a type such that the starting of current between its cathode and anodes may be prevented by the application of a negative potential to the grids 6 and 7. After this current has started, however, it persists till the anode voltage passes through its zero value.

The grids 6 and 7 are connected to the cathode 8 through resistors 13 and 14, opposite halves of the secondary circuit 16 of a transformer 17, and a battery 18 by which a positive bias potential is applied to the grids. The primary circuit 19 of the transformer 17 is connected to the load circuit 2 through a phase control device 20. A source of current shown as a battery 12 may be provided for initiating excitation of the machine 1 if its residual magnetism is insufficient to produce this result.

The operation of the apparatus will be explained by reference to Fig. 2 wherein the potential of the anode 9 for example is represented by the curve 26, different values of the potential applied to the grid 6 through the transformer 17 are represented by the curves 27 and 27', and the positive bias potential applied to the grid 6 by the battery 18 is indicated by the line 28. The resultant potential applied to the grid 6 is thus dependent both on the voltage of the battery 18 and on the voltage of the line 2. Current starts between the cathode 8 and anode 9 at an instant of time dependent on the voltage of the line 2.

Thus if the voltage of the line 2 is slightly above its normal value, the voltage applied to the grid 6 has a magnitude indicated by the curve 27, the resultant potential of the grid is negative at the instant $t_2$ when the potential of the anode 9 becomes positive, current does not start between the cathode 8 and the anode 9 until the instant $t$ when the resultant grid potential becomes positive, the excitation of the machine 1 is decreased, and the voltage of the line 2 tends to decrease to its normal value. If the voltage of the line 2 decreases slightly below its normal value, the voltage applied to the grid 6 has a magnitude indicated by the curve 27', the resultant potential of the grid 6 is positive at the instant $t_2$ when the potential of the anode 9 becomes positive, current is transmitted between the cathode 8 and anode 9 throughout the entire half cycle of anode voltage, the excitation of the machine 1 is increased, and the voltage of the line 2 tends to be restored to its normal value. Variation of the line voltage from its normal value thus produces successive minimum and maximum values of field excitation which are averaged in a manner to maintain this voltage within narrow limits.

Fig. 3 shows an exciter bus 29 which is arranged to supply current to the field windings 30 of the exciters 31 and is connected to the circuit 2 through the valve 5 and the transformer 4. In this embodiment of the invention, the grids 6 and 7 are connected to the cathode 8 through a resistor 32, a direct current source 33 and opposite halves of the secondary circuit of a transformer 34 which has its primary winding 35 connected to the circuit 2 through phase control means shown as a condenser 36 and a resistor 37. It will be observed that the resistor 32 is connected to a current supply means 38 through a space discharge device 39, and that the cathode of the device 39 is connected to the grid of this device through one phase of the circuit 2 and a grid leak device comprising a condenser 40 and a resistor 41.

The operation of the apparatus illustrated by Fig. 3 will be explained by reference to Fig. 4 wherein the potential of the anode 9 is represented by the curve 26, different values of the potential applied to the grid 6 through the transformer 34 are represented by the curves 27, 27' and 27", the positive bias potential applied to the grid 6 by the source 33 is represented by the line 42 and different values of the resultant positive bias potential applied to the grid 6 through the source 33 and the resistor 32 are indicated by the lines 43, 44 and 45. The phase relation between the potentials of grid 6 and anode 9 is dependent on the adjustment of the condenser 36 and may be assumed to be that indicated by Fig. 4.

When the voltage of the circuit 2 is normal, the resultant grid potential comprises an alternating voltage represented by the curve 27 and a resultant positive bias potential represented by the line 44. Under these conditions, the resultant bias potential applied to the grid 6 at the instant $t_2$ when the voltage of the anode 9 becomes positive is substantially zero and current will start between the cathode 8 and the anode 9 either at the instant $t$ or the instant $t_2$ depending on whether the voltage of the line 2 is slightly higher or lower than its normal value.

If the line voltage decreases below its normal value, the alternating component of the grid potential is decreased as indicated by the curve 27' and the resultant positive bias potential is decreased to a value represented by the line 43 due to the decrease in the current transmitted to the resistor 32 through the valve 39. Under these conditions, the resultant potential of the grid 6 is positive at the instant $t_2$ when the voltage of the anode 9 becomes positive, current is transmitted between the cathode 8 and the anode 9 during the entire positive half cycle of anode voltage, the excitation of the machines 1 is increased, and the voltage of the line 2 tends to be increased to its normal value. As the voltage of the line 2 increases, the positive bias potential applied to the grid 6 through the resistor 32 also increases and the tendency to hunting is obviated or greatly reduced because of the fact that the anode current is caused to start at the instant $t$ if the alternating component potential at any time exceeds the positive bias potential when the anode voltage becomes positive.

If the line voltage increases above its normal value, the alternating voltage of the grid is increased to a value indicated by the curve 27", the positive bias potential of the grid is increased to a value represented by the line 45, the resultant potential of the grid 6 is negative at the instant $t_2$ when the anode voltage becomes positive, current starts between the cathode 8 and the anode 9 at the instant $t$ when the resultant grid potential becomes positive, the excitation of the machines 1 is decreased, and the line voltage tends to be decreased to its normal value. As the voltage of the line 2 decreases, the positive bias potential applied to the grid through the resistor 32 also decreases but the resultant positive bias potential of the grid is always maintained at a value fairly close to that of the alternating component of the grid potential so that hunting, due to the line voltage swinging below and above its normal value, is prevented.

Slight variations in the line voltage thus cause a series of maximum and minimum corrective effects which are produced both without hunting and without appreciable time delay and are so averaged to maintain the line voltage within very narrow limits.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. A regulating apparatus comprising an electrical valve provided with a grid arranged to control the current transmitted between its cathode and anode, means operable to control the phase relation between the voltages of said grid and said anode, and means for biasing said grid to a positive potential.

2. The combination of an electrical valve comprising a grid arranged to control the current transmitted between its cathode and anode, means operable to control the phase relation between the voltages of said grid and said anode, and means arranged to apply to said grid a positive bias potential which varies in accordance with the voltage of said anode.

3. The combination of an electrical valve comprising a grid arranged to control the current transmitted between its cathode and anode, means operable to control the phase relation between the voltages of said grid and said anode, means for biasing said grid to a positive potential, and means for applying to said grid a bias potential which varies in accordance with the voltage of said anode.

4. The combination of an electrical valve comprising a grid arranged to control the current transmitted between its cathode and anode, means operable to control the phase relation between the voltages of said grid and said anode, a direct current source arranged to apply a bias potential to said grid, and means arranged to apply to said grid a positive bias potential which varies in accordance with the voltage of said anode.

5. The combination of an electrical valve comprising a grid arranged to control the current transmitted between its cathode and anode, a circuit subject to unstable operating conditions when its load exceeds a predetermined value, a synchronous machine provided with an armature winding connected to said circuit and with a field winding connected to said circuit through the cathode and anode of said valve, and means for applying to said grid a bias potential which varies in accordance with an electrical condition of said circuit.

6. The combination of an electrical valve comprising a grid arranged to control the current transmitted between its cathode and anode, a circuit subject to unstable operating conditions when its load exceeds a predetermined value, a synchronous machine provided with an armature winding connected to said circuit and with a field winding connected to said circuit through the cathode and anode of said valve, means for applying a substantially constant bias potential to said grid, and means for applying to said grid a positive bias potential which varies in accordance with the voltage of said circuit.

In witness whereof, I have hereunto set my hand this 28th day of October, 1926.

ALBERT H. MITTAG.